C. C. HODGES.
MOLDING MACHINE.
APPLICATION FILED MAY 14, 1914.
1,204,871.
Patented Nov. 14, 1916.
2 SHEETS—SHEET 1.
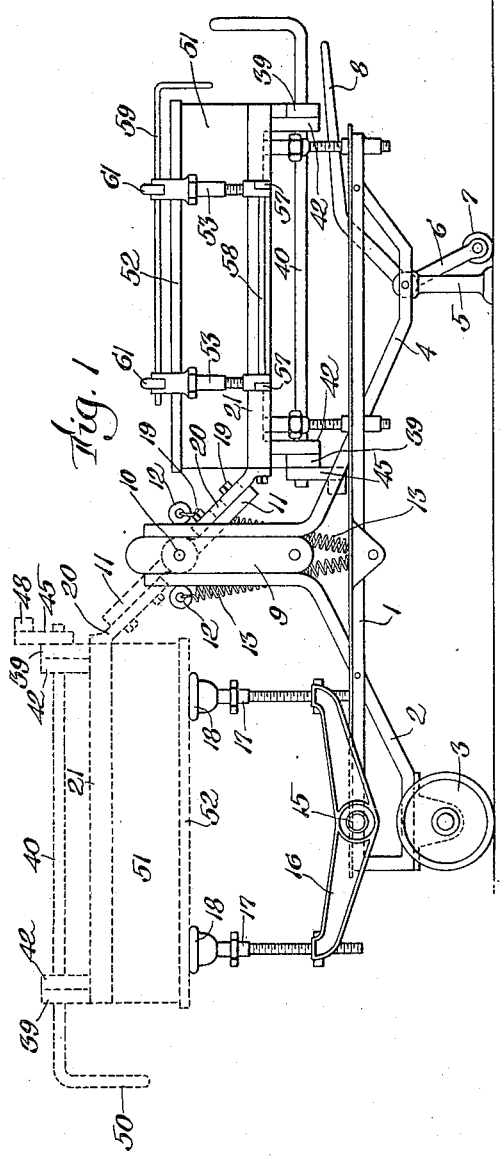
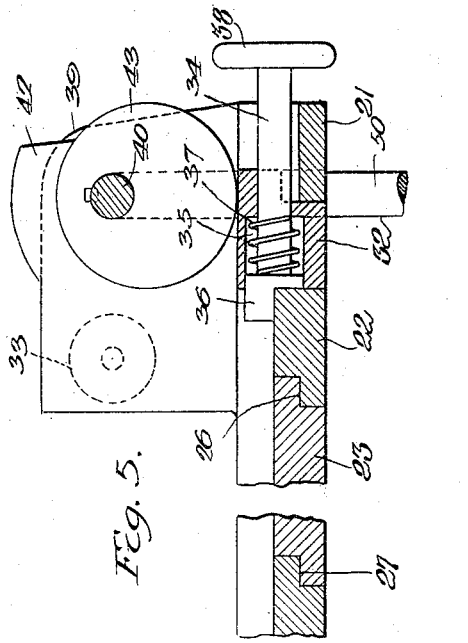
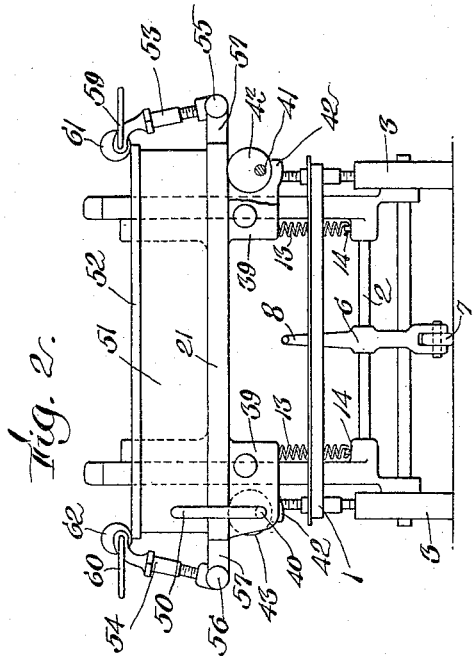
Witnesses:
Edward Maxwell
James R. Hodder
Inventor:
Cornelius C. Hodges,
by Geo. W. Maxwell,
Attorney.

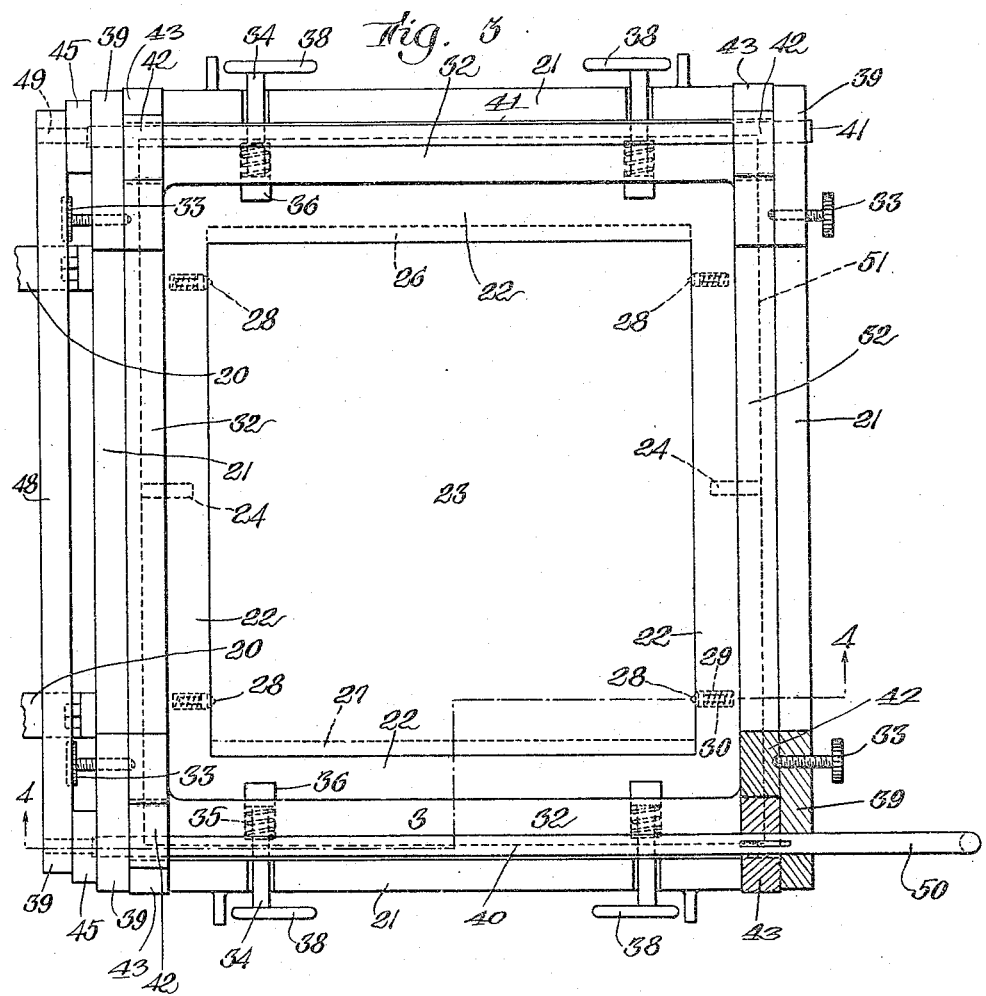
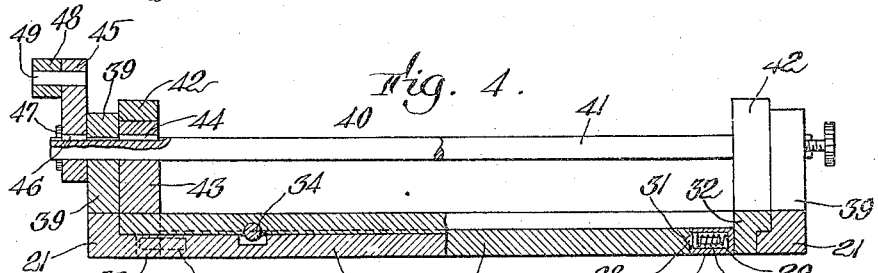

UNITED STATES PATENT OFFICE.

CORNELIUS CALIVE HODGES, OF WATERTOWN, MASSACHUSETTS, ASSIGNOR OF ONE-FOURTH TO GEORGE H. WHITNEY, ONE-FOURTH TO AUGUSTUS RAYMOND, AND ONE-FOURTH TO EUGENE AUBREY, ALL OF WATERTOWN, MASSACHUSETTS.

MOLDING-MACHINE.

1,204,871.

Specification of Letters Patent.

Patented Nov. 14, 1916.

Application filed May 14, 1914. Serial No. 838,601.

*To all whom it may concern:*

Be it known that I, CORNELIUS C. HODGES, a citizen of the United States, and resident of Watertown, county of Middlesex, State of Massachusetts, have invented an Improvement in Molding-Machines, of which the following description, in connection with the accompanying drawings, is a specification, like letters on the drawings representing like parts.

My present invention is a molding machine, combining the advantageous features of a reversible match-plate in molding machines of any commercial type. Heretofore it has been customary, particularly in the socalled rock-over molding machines, such, for example, as that illustrated in the United States Patent 1,027,066, to use two sets of patterns in making a complete mold, one pattern for the cope and one for the nowel. A great difficulty with molding machines of this kind is, of course, in the extra work involved, not only in making two sets of patterns, but also in having the same register properly when the two molding flasks, each with the half of the mold formed thereon, are united preparatory to pouring and casting the article being made. Still further difficulty is found in getting these two patterns sufficiently exact to register in making cast articles with an intricate contour.

I have discovered that, instead of using two patterns, as above briefly explained, in rock-over machines, I can employ a reversible match-plate, thus combining in one machine, the advantageous features of a reversible match-plate for the mold, and the rock-over advantages of machines of this class. By means of my present invention, I am enabled to eliminate the making of duplicate patterns, and, of course, this obviates the difficulties of having such patterns properly register, since I utilize each side of the match-plate to make the respective pattern therefrom. I am aware that prior to my invention match-plates have been used and reversed in small hand machines, but I believe that I am the first in the art to produce, in a practicable and commercial manner, a single molding machine combining the advantages of a reversible match-plate in a rock-over type of machine, and I therefore wish to claim this broadly.

As match-plates are, of course, of different sizes and diameters, I prefer to employ adjusting mechanism which will permit of the ready fitting and removal of any sized match-plate into a reversible frame, and therefore to constitute the adjustable holding frame as the reversible member, so that a match-plate having had one side used to form half of the mold, may be almost instantly reversed to form the other side of the mold.

Further objects of the invention are to provide novel means for holding the match-plate in readily removable position in the frame, for reversing and holding the frame with either side uppermost, in securing the flask in position and in withdrawing the match-plate from the mold after being rocked over, and it is also an object of the invention to provide a suitable match-plate frame which will be applicable to any of the existing types of rock-over machine, so that such machines may be readily equipped to utilize the advantages of my invention.

Referring to the drawings, wherein a preferred embodiment of the invention is illustrated, Figure 1 is a side view of a rock-over type of machine; Fig. 2 is an end view; Fig. 3 is an enlarged bottom plan view of the match-plate frame holder, shown partly in section; Fig. 4 being a cross sectional view on the line 4—4 of Fig. 3, looking in the direction of the arrows; and Fig. 5 is an enlarged detail view of the devices to hold the match-plate and frame in position, showing the same partly in cross section and partly broken away.

I have illustrated in Fig. 1 a type of rock-over machine comprising the horizontal frame 1, having a depending framework 2 at one end supported on wheels 3, and a framework 4 at the other end, carrying a standard 5 and pivoted lever 6, with a trailing wheel 7, and lever handle 8, so that the entire molding machine may be readily transported from place to place, or left in fixed position while being operated. In the frame 1 is secured a vertical plate 9, having a pivot rod 10 on which are slidingly secured two or more arms 11, eye-bolts 12, and counterbalancing springs 13 connecting said eye-bolts with fixed points 14 on the lower part of a fixed portion of the frame 1, this provision of pivot and spring arrangement being well known in this type of machine. To the forward part of the frame is pivoted at 15 a pair of supporting arms 16, one being illustrated in Fig. 1, each arm having adjustable supports 17 and threaded through the ends of the arms 16 and bearing portions 18 at their upper ends to receive the finished and completed mold when the machine is rocked over. To the pivoted arms 11, are secured by bolts 19, brackets 20 on the framework 21, adapted to support and carry the match-plate and tilting frame therefor, and receive the molding flask thereon. The bolts 19 may be arranged through slots in the bracket 20 to permit of an adjustment in assembling these two portions to enable the match-plate holding framework 21 to be fitted to different makes of rock-over machines. The framework 21 is a substantially square, open, boxlike frame, of suitable size for the particular size of rock-over machine built, and is intended to carry a reversible match-plate holder 22 said frame being adapted to receive a match-plate 23, the holder 22 being swiveled on pins 24, intermediate its length, so that the match-plate carried by this swiveled holder 22 may be reversed. In order to fit the apparatus for carrying match-plates of different sizes, the plate holder 22 may have its inner opening of any desired area to receive the match-plate 23. I prefer to form the swiveled holder 22 so that the match-plate fitted therein can be quickly removed, and yet will be firmly supported in position, while in the frame and with a molding flask thereon, while receiving the sand filling and impression. To this end I arrange the frame 22 with beveled shoulders 26 on one end and 27 on the other, see Fig. 5, and with the match-plate 23 correspondingly recessed to fit therein, providing a plurality of plungers 28 around the sides of the holder 22, said plungers being fitted in sockets 29 and pressed outwardly by the springs 30. The plate 23 is provided with slight indentations 31 to receive the outer ends of the plungers 28, which will "snap" into place as the plate 23 is positioned in the swiveled holder 22. The entire holder 22 and match-plate 23 may thus be freely rotated on the pivotal pins 24, to bring either side of the match-plate into uppermost position to form the mold impression in a flask of sand which is placed thereon.

In order that the reversible match-plate 23 and the swiveled reversing holder 22 may be fitted to be withdrawn from a flask in which the mold has been completed, I provide an intermediate frame 32 fitted within the framework 21 and carrying the reversible match-plate holder 22, the pins 24, being carried by the frame 32. This frame 32 is detachably secured to the framework 21 by a plurality of threaded screws 33, which may be readily withdrawn to permit the frame 32 and its match-plate to be lifted, as will be explained. In order to maintain the holder 22 and match-plate 23 in horizontal position on the pins 24, a plurality of sliding plungers 34 fitted through sockets 35 in the frame 32 are provided, each plunger having its outermost end 36 adapted to fit over the edge of the holder 22, see Fig. 5. These sockets 35 are large enough to receive springs 37 encircling the bolts 34 and normally acting to press the same outwardly. Each bolt is fitted with a handle 38 to permit withdrawal of the end 36 from engagement with the holder 22 so that the same may be swung on the pivot pins 24, to reverse the match-plate when changing the mold.

In order to provide for a relative movement between the match-plate 23 and framework 21, I provide on the framework 21 brackets 39 near each end corner, through which shafts 40 and 41 pass. In similar position on the frame 32 are brackets in the form of cams 42, adapted to receive cam wheels 43, secured by keys 44 to the shafts 40 and 41 (see Figs. 2 and 4). The shafts 40 and 41, being rotated, the cam wheels 43 will serve to effect a relative direct sliding movement between the framework 21, and the frame 32, carrying the holder 22, and its match-plate. This direct vertical movement is desirable in order to withdraw the match-plate from the mold, after the mold has been rocked over and before it is entirely withdrawn from the flask. I prefer to connect the rods 40 and 41 together, so that they will be rocked firmly and simultaneously, thus raising the frame 32 at its four corners, caused by the rotation of the cam wheels 43, and thereby lifting the frame and match-plate evenly at all points. To effect this movement, I extend the rods 40 and 41 to receive arms 45, rigidly secured thereto by keys 46 and pins 47 (see Fig. 4), and connect these arms by a rod 48 united to the outer end of each arm 45 by a stud 49. On one of these rods, i. e. 40, is a handle 50, so that turning of the handle 50 will act through the arms 45 and rod 48, as just described, to similarly rotate the rod 41 and simultaneously move the cam wheels 43 to effect a relative sliding movement of the frame 32 with the outer framework 21.

With the match-plate fitted within its desired position uppermost to make a pattern, and on the right of the machine as shown in Fig. 1, as is usual, a flask 51 is fitted thereon, such position being indicated generally in dotted lines on Fig. 3, it being understood that any means, such as the usual pins in one flask and corresponding holes in the other, may be employed to register or hold the flask 51 temporarily to the frame 32.

The molding sand is then filled in the flask 51, and rammed downwardly as is usual, and thereupon the sand is leveled off even with the top of the flask 51, and a cover 52 is applied. To hold this cover down securely during the rocking over movement, a pair of clamps 53 and 54 are provided, being pivoted at 55 and 56 respectively, to extensions or brackets 57, on opposite sides of the frame 21, by a rod 58 (see Figs. 1 and 2). In the upper end of the clamps 53 and 54, is a bearing for rods 59 and 60 respectively, said rods being keyed to a pair of eccentrics 61 and 62, which are preferably held in forked ends of each clamp, as clearly shown in the drawings. These clamps are thrown upwardly and the eccentrics tightened by proper manipulation of the rods 59 and 60, whereupon the entire flask and framework 21 are rocked over to rest upon the bearing portions 18, as shown in dotted lines in Fig. 1. While in this position the cams 61 and 62 are released, the clamps 53 and 54 thrown backwardly, and the handle 50 turned to partially rotate the shafts 40 and 41, thus actuating the cam wheels 43 to lift the frame 32, holder 22 and match-plate 23 vertically, upwardly, and outwardly from its position in the mold, while the frame work 21 is still stationary thereon. The match-plate having been lifted outwardly so that the form molded will clear the molding sand, the framework 21 is then rocked over backwardly into its original position. It is now desired to reverse the match-plate 23, so that the other part of the mold may be made, and accordingly, a pair of the rim retaining bolts 34 are moved against the tension of springs 35 to remove the ends 36 from engagement with the holder 23, whereupon the holder and match-plate 23 are reversed by being rocked on the pivots 24, and the other side of the match-plate is brought uppermost, and held in position by the bolts 34 springing backwardly. In this position the second half of the mold may be made and a second flask positioned thereon, sand rammed downwardly, and this completed flask rocked over as before.

Thus I am enabled to make both halves of a complete mold on the same rock-over machine, by simply reversing the match-plate between operations, whereas formerly it was necessary to have two machines, one fitted with a nowel pattern and the other with a cope pattern, together with all the disadvantages, difficulties, cost, and unsatisfactory method of first making patterns from a match-plate and then casting from these patterns. My invention enables a reversible match-plate to be readily fitted into or removed from the pivoted holder and furthermore permits the match-plate holder to be vertically withdrawn from a mold in a very expeditious manner.

While I have illustrated my invention of a reversible match-plate holder as applied to a molding machine of the rock-over type, it will readily occur to those skilled in the art that I may apply the same equally well to a jolting or jar-ramming machine, as well as to a squeezing molding machine, all these prior types of commercial machines depending on the use of sets of patterns in the same manner as that explained with the rock-over machines. My invention enables molding machines of these types to employ a reversible match-plate and to secure and obtain all the benefits, advantages, simplicity of operation, accuracy in molding and economy resulting therefrom. The means I have illustrated for withdrawing the match plate from the mold after the same is completed is peculiarly applicable to the rock-over type of machine, and I have therefore illustrated my invention in connection with this form of molding apparatus.

Having described my invention, what I claim as new and desire to secure by Letters Patent is:

1. A machine of the class described, having in combination, means to carry a match-plate, means permitting reversal of said match-plate in its carrier, mechanism to rock said carrier over in reverse position, and means to vertically withdraw said carrier from the mold.

2. A machine of the class described, having in combination, means to carry a match-plate, means permitting reversal of said match-plate in its carrier, a frame for said carrier, and mechanism to effect a sliding movement between said frame and carrier.

3. A machine of the class described, having in combination, means to carry a match-plate, means permitting reversal of said match-plate in its carrier, a frame for said carrier, and mechanism to effect a sliding movement between said frame and carrier, comprising a plurality of eccentric cam wheels arranged adjacent the four corners of said frame, and means to impart rotative movement to each of said cam wheels simultaneously, whereby a vertical sliding movement is effected between the match-plate and the frame.

4. A machine of the class described, having in combination, means to carry a match-plate, means permitting reversal of said match-plate in its carrier, a framework to hold said carrier with provision for relative sliding movement between the frame and the carrier, adjustable means to connect said framework with a pivotal hinge support, whereby said frame and carrier may be rocked over on the support to reverse position.

5. A machine of the class described, having in combination, a reversible frame to carry a match-plate, means constructed and arranged to hold a molding flask on said match-plate, clamps on said frame to hold the molding flask and match-plate together, in combination with mechanism to effect a vertical sliding movement between the flask and match-plate when said clamps have been removed.

6. A machine of the class described, having in combination, a framework to carry a match-plate and receive a molding flask thereon, means on the framework to clamp said flask to the match-plate, said clamping means comprising cam wheels pivotally secured to the framework and means to rotate said cam wheels.

7. A molding machine, having a reversible frame to carry a match-plate, detachable means to hold said match-plate in said frame, means permitting reversal of the carrying frame while said match-plate is held therein, and means to attach the carrier frame to the molding machine.

8. A molding machine, having a reversible frame to carry a match-plate, detachable means to hold said match-plate in said frame, means permitting reversal of the carrying frame while said match-plate is held therein, and adjustable means to attach the carrier frame to the molding machine.

In testimony whereof, I have signed my name to this specification, in the presence of two subscribing witnesses.

CORNELIUS CALIVE HODGES.

Witnesses:
GEO. H. WHITNEY,
JAMES R. HODDER.

Copies of this patent may be obtained for five cents each, by addressing the "Commissioner of Patents, Washington, D. C."